Nov. 30, 1965   J. H. CREAGER   3,220,387
ROTARY INTERNAL COMBUSTION ENGINE
Filed May 22, 1963   3 Sheets-Sheet 1
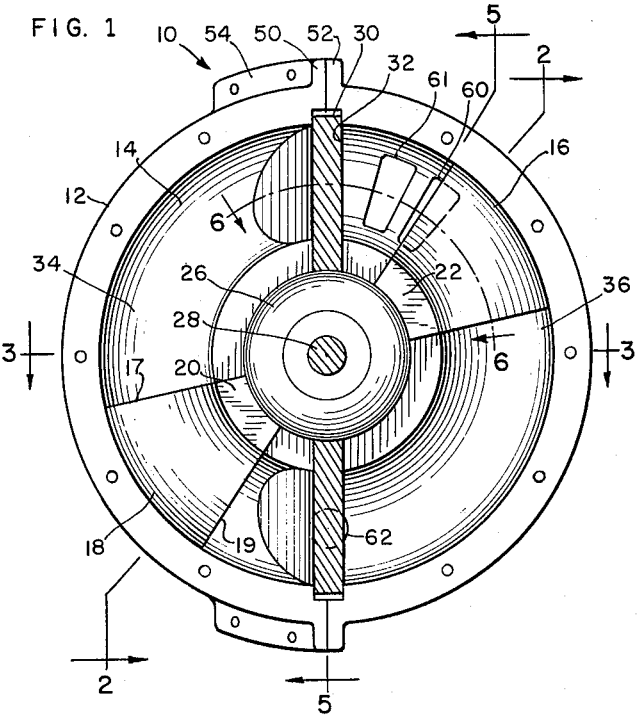
INVENTOR.
JACK H. CREAGER
BY BUCHORN, BLORE,
KLARQUIST & SPARKMAN
ATTORNEYS Nov. 30, 1965   J. H. CREAGER   3,220,387
ROTARY INTERNAL COMBUSTION ENGINE
Filed May 22, 1963   3 Sheets-Sheet 2
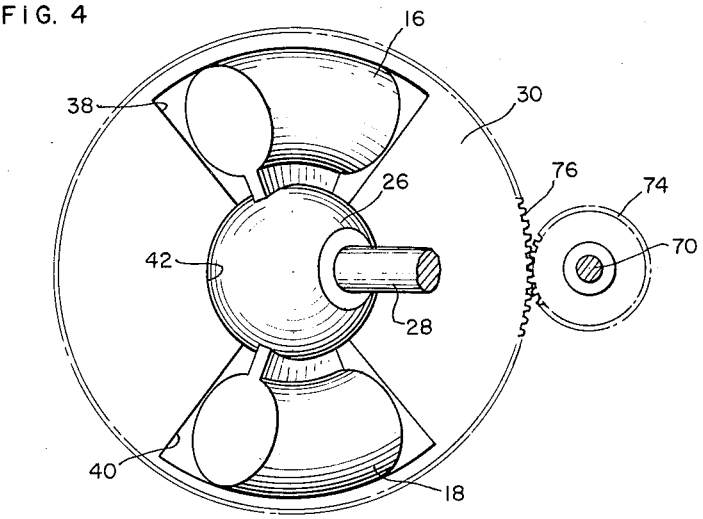
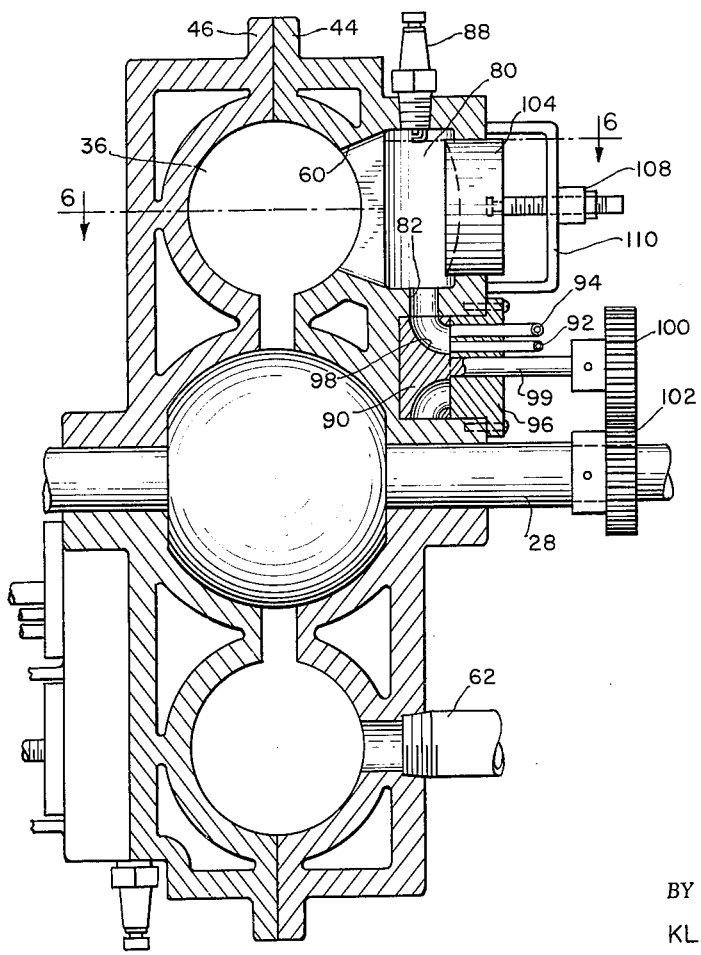
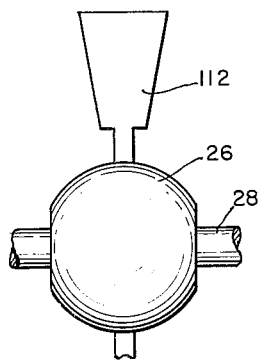
INVENTOR.
JACK H. CREAGER
BY BUCKHORN, BLORE,
KLARQUIST & SPARKMAN
ATTORNEYS Nov. 30, 1965  J. H. CREAGER  3,220,387
ROTARY INTERNAL COMBUSTION ENGINE
Filed May 22, 1963                    3 Sheets-Sheet 3

INVENTOR.
JACK H. CREAGER
BY BUCKHORN, BLORE,
KLARQUIST & SPARKMAN
ATTORNEYS

United States Patent Office 3,220,387
Patented Nov. 30, 1965

3,220,387
ROTARY INTERNAL COMBUSTION ENGINE
Jack H. Creager, 27 Glen Oak Court, Medford, Oreg.
Filed May 22, 1963, Ser. No. 282,343
4 Claims. (Cl. 123—13)

The present invention relates to a rotary internal combustion engine and more particularly to one having a toroidal bore and pistons which travel continuously in the same direction within such bore to drive a central power shaft.

In rotary engines of the above type, propellant force commonly is applied to the pistons by the introduction of a fuel charge into the bore at timed intervals behind the continuously moving pistons. Just prior to ignition of the charge a portion of the bore immediately behind each piston is sealed off by a valve structure in the wall of the bore to provide a plurality of combustion chambers. Accordingly, after a piston passes a given valve, the valve must close rapidly and be followed by quick, almost instantaneous injection and firing of a fuel charge if any substantial portion of the explosive force of the charge is to be utilized to drive the piston.

One of the major disadvantages of previously proposed rotary engines of the toroidal bore type is that the various valve arrangements for intermittently partitioning the bore into chambers are relatively slow acting due primarily to their oscillatory or reciprocatory movements and the accompanying overly complex mechanisms necessary to actuate them, thus reducing the effectiveness of such engines.

Another major disadvantage of rotary engines of this type heretofore is that because the fuel charge has been injected directly into the toroidal bore, in the ever increasing space between the trailing edge of a piston and a bore-partitioning valve, no compression of the charge occurs in the bore, and ignition of the charge occurs while it is under a minimum of pressure. Thus, only a small portion of the expansive potential of the charge is utilized in such arrangements to drive the pistons, and consequently the engine develops only very low power.

One of the primary objects of the present invention, therefore, is to provide a new and improved rotary engine having a toroidal bore which is partitioned into a pair of bore chambers by a continuously rotating, apertured disk which passes laterally through the bore at two, 180° spaced apart locations.

A more specific object of the invention is to provide a new and improved rotary engine of the above type including means operatively connected to the central power shaft of the engine for rotating the apertured disk continuously in the same general direction of rotation as the piston and in predetermined timed relation to the rotation of the pistons so that an aperture on such disk comes into register with the bore at such intervals as to permit the pistons within such bore to pass through the disk from one chamber to the other.

Another primary object of the present invention is to provide a new and improved rotary engine having a toroidal bore and a combined compression and combustion chamber which is laterally offset from and opens into such bore just ahead of the valve means for partitioning the bore whereby a fuel charge is compressed and initially fired in such offset chamber and the resultant expansive force is then directed into the bore chamber behind the moving piston.

Still another object of the invention is to provide a rotary engine as described in which a port from the combustion chamber to the bore chamber is provided with a valve responsive to the expansive force of an explosion within the combustion chamber whereby the firing of a fuel charge opens such port to permit the expansive force of the explosion to enter the bore chamber.

Another object of the invention is to provide a new and improved rotary engine including a toroidal bore, a laterally offset combustion chamber and means for regulating the size of the combustion chamber whereby the compression ratio of the fuel charge may be preselected in accordance with the power requirements for a given use of such engine.

The foregoing and other objects and advantages of the present invention will be more readily ascertained from inspection of the following specification taken in connection with the accompanying drawings, wherein like numerals refer to like parts throughout, while the features of novelty will be more distinctly pointed out in the appended claims.

In the drawings:

FIG. 1 is a side elevational view of one-half of the engine housing;

FIG. 2 is a sectional view through the housing taken along the line 2—2 of FIG. 1;

FIG. 3 is a sectional view through the housing taken along the line 3—3 of FIG 1;

FIG. 4 is a partially schematic view taken along the line 4—4 of FIG. 3 showing the relationship of the disk, pistons, and drive shaft;

FIG. 5 is an enlarged sectional view taken approximately along the line 5—5 of FIG. 1 showing a combustion chamber and fuel injection means of the engine in accordance with the invention;

FIG. 7 is a view showing a modified form of piston in accordance with the present invention.

Figure 8:
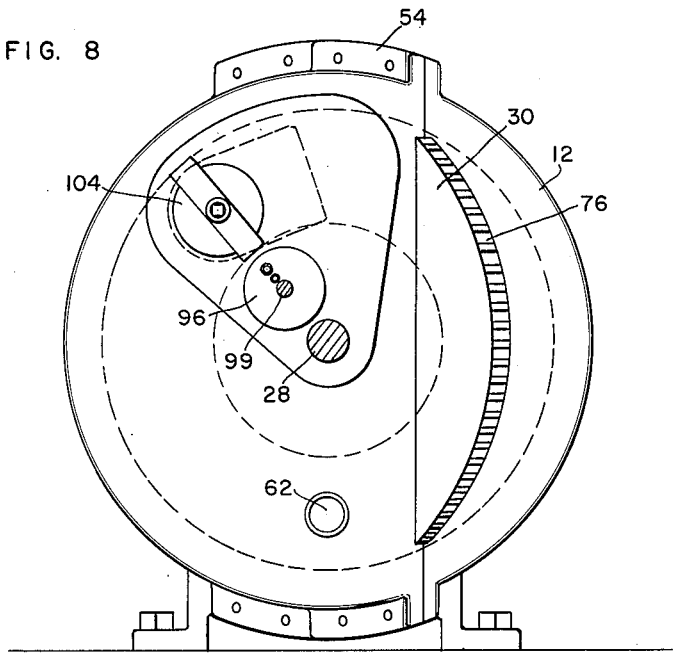
FIG. 8 is a front elevational view of the engine fully assembled.

First with reference to FIGS. 1 and 8 of the drawings, a rotary engine 10 includes a generally circular housing 12 including wall portions 13 which define a continuous toroidal bore 14. A pair of oppositely disposed pistons 16, 18 each having leading and trailing ends 17 and 19 are of a diameter to be slidably received within the bore 14 and are connected by rigid web members 20 and 22, which project through a continuous slot 24 in the wall of the bore, to a frusto-spherical hub 26 of a central power shaft 28. Thus, the axis of rotation of the power shaft 28 and that of the pistons 16 and 18 are coincident with each other and with the axis of revolution of the toroidal bore 14. The power shaft is journaled in suitable bearings 29 in the housing.

With reference to FIGS. 1 and 3, a rotatable disk 30 having an outer diameter slightly larger than the maximum overall diameter of the toroidal bore, passes obliquely through a diagonally extending slot 32 in the housing and at an oblique angle through the bore 14 at two 180° spaced apart locations so as to partition the bore into two bore chambers 34 and 36 of substantially equal size. As shown most clearly in FIG. 4, the disk 30 is provided with a pair of oppositely disposed apertures 38 and 40 which divide the disk into segments which are of a sufficient size to permit the passage of the pistons 16 and 18 therethrough. By synchronizing the unidirectional rotation of the disk with that of the pistons so that the apertures 38, 40 are in register with the bore just as the pistons pass over the slot 32 from one chamber to the other, both the pistons and the disk are enabled to rotate continuously and freely through the bore.

The disk 30 also is provided with a central aperture 42 having a diameter just large enough to permit the disk to slip over the hub 26 whereby the internal central edge of the disk defining such aperture bears against and is supported by the spherical surface of the hub 26 during their respective rotative movements.

The disk may pass through the bore at any oblique angle so long as the disk partitions the bore transversely and also clears the power shaft 28. The axis of rotation of the disk intersects the axis of rotation of the power shaft at an angle less than 90°, but in most instances an angle of about 45° as shown, or more, is preferred, inasmuch as the larger such angle, the quicker a segment of the disk can close behind the piston and hence the smaller may be the space behind such piston within which expansion of the fuel charge occurs.

The housing 12, for convenience in assembly and maintenance, is divided longitudinally into two half sections 44, 46 which are normally secured together by bolts 48 at the periphery of such sections as shown in FIG. 3. Each half section in turn is divided obliquely into quarter sections 50, 52, along the center line of the slot 32 to further facilitate assembly and maintenance, especially of the disk 30, and such quarter sections are held together by suitable bolts through peripheral housing flanges 54.

Figure 6:
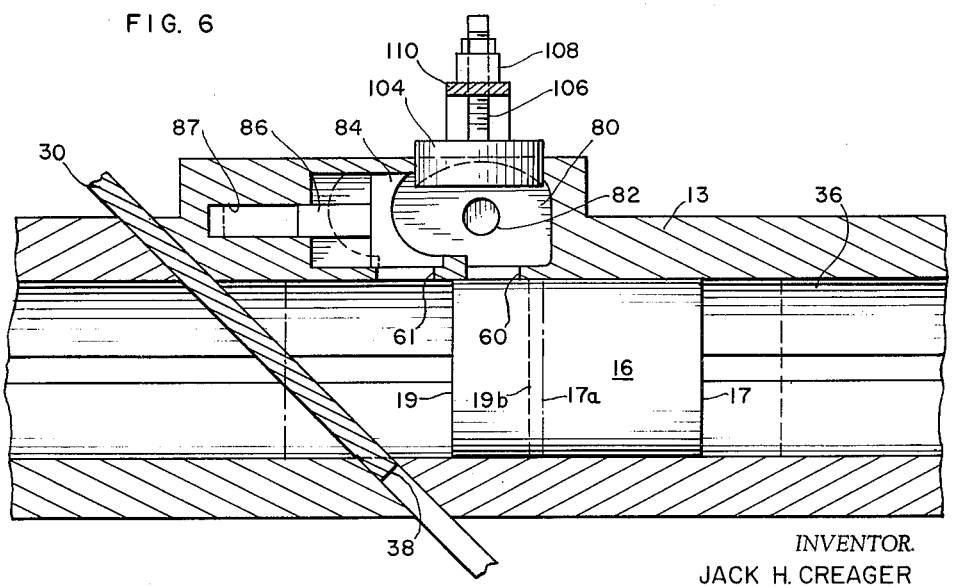
FIG. 6 is a view taken along the line 6—6 of FIGS. 1 and 5.

Each bore chamber 34, 36 is provided with a pair of inlet or fuel ports 60 and 61 and an exhaust port 62 in the walls thereof, the inlet ports for each chamber being at the end thereof at which the piston 16 enters, and the exhaust port for the same chamber being at the opposite or exit end thereof. From FIGS. 1 and 6 it will be noted that both the inlet and the exhaust ports of one chamber 36 are in the same half section 44 of the housing, whereas the corresponding ports of the outer chamber 34 are in the opposite half section 46. The exhaust port 62 of each chamber opens outwardly of the housing on the side thereof away from the diagonally extending disk 30 as shown in FIGS. 6 and 8 so that exhaust gases are not expelled into such disk.

With reference to FIG. 1, the pistons travel in a clockwise direction of rotation. Just after the piston 16 passes through an aperture 38 in the disk 30 and across the slot 32 in the housing to enter the chamber 36, a segment of the rotating disk seals off such chamber to define an ever enlarging space between the trailing end 19 of the piston and the disk 30. A fuel charge or expansive medium is fired in an offset combustion chamber, the details of which are described below, and the resultant expansive force of such medium is directed through the inlet ports 60 and 61 into the bore chamber behind the piston 16 to propel such piston continuously in the same direction. As the piston 16 approaches the exit end of the chamber 36, it scavenges the spent gases or medium from the previous explosion out of such chamber through the exhaust port 62. Then as the piston 16 reaches the slot 32 at the exit end of the chamber 36, an aperture in the rotating disk 30 again comes into register with the bore to provide passage for the piston 16 into the adjacent chamber 34, wherein the same cycle repeats itself. Of course, the combustion-exhaust cycle just described occurs in each chamber 34, 36 simultaneously with respect to the pistons 18 and 16, respectively, and two firings, one for each piston, occur within each combustion chamber for each revolution of the power shaft, or a total of four firings per revolution.

While the hub 26 illustrated is provided with two pistons, any number of pistons may, of course, be provided so long as a like number of apertures are provided in the rotating disk 30. For example, in a larger engine than the one shown, it may be desirable to provide four equally spaced apart pistons, in which case the disk would be provided with four equally spaced apart apertures, and four explosions, one for each piston, would then occur in each chamber per revolution of the drive shaft. However, rather than increasing the power developed by increasing the size and number of pistons provided, the same result may be achieved with the present engine by connecting a series of the individual engine units to a common power shaft.

The rotating disk 30 is driven off one end of the power shaft 28, by a suitable gear train such as the simplified one shown in FIG. 3 so that the disk is caused to rotate in the same general direction as that of the pistons, that is in a clockwise direction as illustrated. The gear train shown includes a main driving bevel gear 66 mounted on the stub end of a power shaft 28 which gear engages a smaller driven bevel gear 68 mounted on a stub shaft 70 journaled in a suitable sleeve bracket 72 attached to the housing 12. A second gear 74 on the stub shaft 70 engages a ring gear 76 mounted on the periphery of the disk 30. In the gear train shown, the drive gear 66 and the spur gear 68 have a four to one ratio, and the gear 74 and ring gear 76 have a one to four ratio, whereby the disk 30 will be driven at the same angular velocity as that of the pistons in order that the disk may be timed so that the registration of the disk apertures with the above always coincides with the passing of the pistons across the slot 32 from one bore chamber to the next.

As illustrated in FIGS. 5 and 6, one of the unique features of the present engine is the provision of an offset compression and combustion chamber 80 at the entrance end of each bore chamber and laterally offset from and interconnected with the same through the pair of inlet ports 60 and 61. Fuel and air, which together comprise an expansive propelling medium, are injected under high pressure into the chamber 80 through a port 82 in the bottom wall thereof beginning when the leading end 17 of the piston 16 is in a position as illustrated by the dashed line 17a of FIG. 6 just ahead of the inlet port 60 so that the combustion chamber 80 is sealed off from the bore chamber by such piston. An L-shaped sliding valve 84 partitions the combustion chamber 80 into a front and a rear section, and such valve includes a rearwardly projecting rear guide portion 86 slidably received within a cooperative guideway portion 87 in the rear section of such chamber 80. A constant air pressure from an external source (not shown) is maintained in the rear section of the chamber 80 behind the sliding valve 84, which pressure is slightly greater than the maximum pressure of the expensive medium within the chamber 80 before combustion so as to bias the valve forwardly, thereby closing the inlet port 61.

Just as the trailing end 19 of the piston approaches the rear edge of the port 60, in the piston position illustrated in solid lines in FIG. 6, a spark plug 88 in the wall of the chamber 80 ignites the compressed fuel medium within such chamber. The resulting explosion drives the sliding valve 84 rearwardly to open the port 61 whereby the expansive force of the explosion is directed into the bore chamber 36 to propel the piston 16. By this time too, the trailing end 19 of the piston 16 has cleared the inlet port 60 and is in a position 19b shown in dotted lines so that a portion of the expansive force of the explosion is directed outwardly into the bore chamber 36 through such port. Following the explosion the air pressure behind the sliding valve 84 again exceeds the now reduced pressure in the combustion or front section of the chamber 80, causing the valve 84 to slide forwardly across the port 61, whereby the injection and firing cycle may be repeated upon the entry of the other piston 18 into the bore chamber 36.

A rotating cylindrical valve 90 is positioned between the port 82 and a pair of fuel and air feed lines 92 and 94 and provides for proper metering and timing of the fuel and air injection into the chamber 80. The fuel and air lines 92 and 94 are anchored in a stationary cap 96 enclosing the valve 90. The valve 90 is provided with two right angle passages 98 therethrough spaced 180° apart, each of which has one opening in the outer surface of such valve that registers with the terminal ends of the fuel and air lines 92 and 94 once each revolution of the valve. Another opening of each passage 98 is in the peripheral surface of the valve and registers with the fuel port 82 at the same time that the one opening is in registration with the fuel and air lines, thereby providing a clear passageway from the fuel and air lines through the valve 90 to the combustion chamber 80. A shaft 99 journaled in the cap 96 is affixed at one end to the valve 90, and a gear 100 is mounted at the other end of such shaft. The gear 100 engages a drive gear 102 of equal ratio on the main power shaft 28 so that the valve 90 and the shaft 28 rotate at the same speed. Thus, fuel is injected into the combustion chamber twice each revolution of the power shaft.

The combustion chamber 80 is also provided with an inwardly movable, cylindrical outer wall member 104 by which the volume of the combustion chamber may be regulated. The movable wall member 104 is mounted centrally on one end of an externally threaded shaft 106 which is threaded through an internally threaded collar 108 of a yoke member 110 secured to the housing. The shaft 106 is operatively connected by any suitable means for rotating the same to a suitable manual or power control means as desired. Also, the means for moving the wall member 104 may be operatively linked to a corresponding means controlling the movement of the outer wall member of the combustion chamber for the other bore chamber 34 whereby the size of both chambers may be regulated simultaneously and to the same extent.

FIG. 7 illustrates a modified form of piston 112 having a trapezoidal cross sectional shape. This shape of piston approximates the shape of the apertures 38 and 40 in the disk 30 so as to provide closer synchronization of apertures and the pistons to enable the disk to close more closely behind the piston than is possible with a circular piston. Accordingly, an even smaller effective expansion space and thus a more efficient use of the expansive force resulting from the explosive fuel mixture will result.

It will be apparent from the foregoing description that one of the primary advantages of the present rotary engine over others of the toroidal bore type is the more rapid closure of the bore at intervals behind the pistons that is obtained by the use of a disk rotating in the same general direction as the pistons. The additional feature of an offset combustion chamber in which the fuel charge is compressed to the desired extent within a closed space of constant volume and then fired increases the expansive force developed over that which would be possible by direct injection and firing in the ever expanding bore chamber behind each piston.

The machine as described above may be used as a positive action, hydraulic or air pump or air compressor by a simple modification of the ports and valves, which modification will be obvious to those skilled in the art.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:
1. A rotary piston internal combustion engine comprising:
   a housing defining a single toroidal bore, a central spherical hub chamber spaced inwardly of and coaxial with said bore, and an annular slot connecting said toroidal bore and said hub chamber,
   a rotor, including at least two driven pistons within said bore, a spherical hub within said spherical chamber and web means within said slot rigidly connecting said pistons and said hub, all mounted for rotary sliding movement within their respective openings within said housing,
   a drive shaft extending through said housing and affixed to said spherical hub, the axis of said shaft being coincident with the rotary axis of said pistons and hub such that rotation of said pistons about their rotary axis results in rotation of said shaft about its coincident axis,
   a rotatable disk having a diameter greater than the overall diameter of said toroidal bore mounted on said spherical hub for rotation about an axis intersecting the axis of rotation of said hub at a constant oblique angle,
   said disk passing through said bore at two 180-degree spaced-apart positions so as to partition said bore into two piston chambers of equal size, each having an entrance end and an exit end with respect to the direction of travel of said pistons,
   said disk having a plurality of equally circumferentially spaced apertures therein corresponding in number to the number of said pistons,
   said apertures being positioned in said disk and being of sufficient size so as to permit said pistons to pass therethrough,
   gear means connecting said drive shaft and said disk in a 1:1 ratio and said apertures and said pistons being positioned relative to each other such that each of said pistons passes through one of said apertures twice during each revolution of said disk and rotor,
   means defining a pair of combustion chambers, one offset laterally from the entrance end of each said piston chamber,
   said housing including means defining a combustion inlet port connecting each said combustion chamber with the entrance end portion of its associated piston chamber through the walls defining said toroidal bore,
   fuel injection means for injecting under pressure a combustible fuel mixture into each said combustion chamber once for each time a piston enters the associated said piston chamber,
   fuel ignition means within each said combustion chamber for igniting said fuel mixture,
   and valve means within each said combustion chamber normally closing the associated said inlet port, said valve means being movable to open said inlet port in response to the combustion of fuel within said combustion chamber such that the force of said combustion is transmitted through said inlet port into the piston chamber behind a piston,
   the combustion in each said combustion chamber being timed such that it occurs immediately upon the closure of the associated piston chamber by said disk following the entrance of each piston therein, whereby each piston undergoes a power stroke in each piston chamber and a total of two power strokes per revolution,
   said housing defining an exhaust port through the wall of said toroidal bore at the exit end of each piston chamber such that each advancing piston within the same said chamber scavenges the exhaust gases from the preceding piston therewithin.

2. A rotary engine according to claim 1 wherein said fuel injection means includes a fuel port in constant communication with said combustion chamber, a rotatable valve means having separate fuel and air passages therein positioned for periodic registration with said fuel port upon rotation of said valve means, said valve means being operatively connected to and driven by said power shaft in timed relation to the passage of each piston into the associated said piston chamber such that fuel and air are introduced separately into said fuel port and mixed initially within said fuel port and said combustion chamber to form a combustible fuel mixture.

3. A rotary piston internal combustion engine according to claim 1
   wherein the entrance end of each piston chamber is angular because of the intersection of said toroidal bore by said disk at an oblique angle,
   and wherein the combustion chamber for each said piston chamber is offset laterally on the side of said entrance end that each said piston enters first and clears first because of said angular entrance end,
   each said entrance end being connected to its associated combustion chamber by two circumferentially closely spaced-apart combustion inlet ports, one of said inlet ports being positioned closer to said disk than the other said port such that immediately upon the passage of an entire piston through an aperture in said disk said one inlet port is cleared by said piston, the other of said inlet ports being positioned next adjacent to said one port in the direction of travel of said pistons such that each said piston extends across both ports simultaneously for an interval during its passage through said piston chamber, a sliding valve member normally closing said one inlet port, said sliding valve member being slidable to open said one inlet port in response to combustion within said combustion chamber, the other of said inlet ports being normally open and closable only by a piston passing thereacross such that fuel under pressure can be injected into each said combustion chamber when a piston extends across both said ports and such that said fuel can be ignited within said combustion chamber as soon as said disk closes the associated piston chamber behind a piston so that the expansive force of combustion is immediately available to propel said piston.

4. A rotary piston internal combustion engine according to claim 3 wherein said sliding valve member includes a generally L-shaped head portion having a concave impact surface for receiving the force of combustion, said valve member normally being biased forwardly by air under pressure so that the base of said L-shaped portion closes said one inlet port, said combustion chamber including an adjustable wall portion for varying the size of said chamber and thus the speed of said engine.

References Cited by the Examiner
UNITED STATES PATENTS

| | | | |
|---|---|---|---|
| 753,086 | 2/1904 | Mains | 60—39.61 |
| 1,618,360 | 2/1927 | Wellman | 123—13 |
| 1,719,378 | 7/1929 | Moritz | 123—13 |
| 1,773,635 | 8/1930 | Simmons | 123—13 |
| 2,318,386 | 5/1943 | Haines | 103—144 |

FOREIGN PATENTS

| | | |
|---|---|---|
| 388,342 | 2/1933 | Great Britain. |

KARL J. ALBRECHT, *Primary Examiner.*

JOSEPH H. BRANSON, JR., *Examiner.*

UNITED STATES PATENT OFFICE
CERTIFICATE OF CORRECTION

Patent No. 3,220,387                          November 30, 1965

Jack H. Creager

It is hereby certified that error appears in the above numbered patent requiring correction and that the said Letters Patent should read as corrected below.

Column 4, line 15, for "above" read -- bore --; line 39, for "expensive" read -- expansive --.

Signed and sealed this 25th day of October 1966.

(SEAL)
Attest:

ERNEST W. SWIDER                         EDWARD J. BRENNER
Attesting Officer                             Commissioner of Patents